April 15, 1952 M. H. SUSSIN 2,593,216
AUTOMATIC DIAPHRAGM CONTROL SYSTEM
Filed July 10, 1950 5 Sheets-Sheet 1

Fig.1

Inventor
Max H. Sussin
by Parker + Carter
Attorneys

April 15, 1952   M. H. SUSSIN   2,593,216
AUTOMATIC DIAPHRAGM CONTROL SYSTEM
Filed July 10, 1950   5 Sheets-Sheet 2

Inventor
Max H. Sussin
by Parker & Carter
Attorneys

Fig. 4

Inventor
Max H. Sussin
by Parker & Carter
Attorneys

Fig. 6

Inventor
Max H. Sussin
by Parker + Carter
Attorneys.

Patented Apr. 15, 1952

2,593,216

UNITED STATES PATENT OFFICE 2,593,216

AUTOMATIC DIAPHRAGM CONTROL SYSTEM

Max H. Sussin, Chicago, Ill., assignor to R. R. Robertson Company, Chicago, Ill., a corporation of Illinois Application July 10, 1950, Serial No. 172,903

21 Claims. (Cl. 88—24)

This invention relates to automatic control systems for effecting a series of successive mechanical operations, each in accordance with predetermined formulae including at least two mutually variable factors, which control system causes the machine or apparatus, when once adjusted to accommodate the system to one of these variable factors and set in operation, to go through an entire cycle of such successive operations and be returned to an initial or starting point without any attention from the operator.

The automatic control system of my invention is particularly adapted for use in half-tone camera work, wherein a half-tone screen is used to break up the continuous tone of a copy into half-tone dots of varying sizes, but many features of my system can also be employed in other kinds of automatic machines.

It has heretofore been recognized that the most faithful reproduction, in half-tone of the original copy with all its lights and shadows, is obtained by half-tone camera work where successive exposures of the copy are made with different lens diaphragm openings. At least two, and usually three, such successive exposures are usually made for this purpose, the different diaphragm settings being commonly referred to as "high-light" (hereinafter referred to as "hilite"), "middle-tone," and "detail" stops. Separate exposures are preferably made at each of said stops, with a uniform light but at certain predetermined time periods, to produce half-tone dots of proper size, intensity and sharpness of definition on the sensitized film or plate of the camera.

In addition to the hilite, middle-tone and detail exposures, it is common practice to break up the solid black areas of a copy by a fourth or "flash" exposure, wherein a uniform flood of light is substituted for the copy and photographed through the screen with a relatively small "f" stop, to produce tiny openings in the deep shadow or black areas of the half-tone reproduction.

In many cases, certain exposures, such as the "detail" and "flash," may be omitted, depending upon the requirements of the particular copy being reproduced.

It is also generally recognized that, for best results, there is a certain optimum ratio between the relative size of copy and reproduction on the one hand, and the "f" settings on the other, for the hilite, middle-tone, detail and flash exposures. These optimum ratios are fairly constant for most lenses, although slight variations may be encountered, where a compensating adjustment is desirable.

It is manifestly difficult and laborious for an operator to make successive exposures at proper time intervals and with proper lens stops, depending upon the relative size of copy and reproduction, all by manual manipulation and adjustments of the camera. He usually depends largely upon complicated charts for the diaphragm and time settings for each successive exposure. The operator must be constantly present and on the alert to effect the many necessary manual adjustments and manipulations without error.

In order to eliminate such manual manipulations, and the many possibilities of human error incident thereto, automatic control devices have hertofore been designed and used, wherein the copy is exposed to the sensitized film continuously, while the size of the diaphragm arerture is continuously decreased from a relatively large or "hilite" stop, through the middle-tone and detail stops. A separate flash exposure is then made with a still smaller "f" stop, and with a flood of light substituted for the copy. Although such automatic continuous exposure devices have reduced the amount of care and manual manipulation required of the operator, yet they have definite limitations and disadvantages, particularly because of a marked deficiency in clarity and sharpness of definition of the hilite, middle-tone and detail dot sizes obtainable with a continuous exposure and with simultaneous variations in diaphragm size.

Moreover, it is difficult to adjust such continuous exposure control devices so as to increase or decrease the exposure time at any one or more of the specific stop points as may be required for varying copy conditions, without complicated mechanical adjustments in the control system. Also, it is always necessary to close the shutter to make a flash exposure as a separate operation.

The principal object of the present invention, as applied to half-tone camera work, is to provide an automatic control system which is capable of being initially set to effect a complete cycle of successive exposures at a plurality of successive lens stop positions, each with its proper predetermined exposure time, without any attention from the operator.

A further object is to provide an automatic control system which, in addition to producing the successive exposures each at different lens stop positions and at predetermined exposure times, will make a flash exposure at the proper lens stop, and with a flash curtain or flash lamp automatically positioned for such flash exposure.

A still further object of the invention is to provide means, including a so-called "master plate," automatically responsive to a presetting of devices associated with said master plate at the relative size of the copy and its reproduction, so as to give the proper lens stop for each of the successive exposures.

Another object is to provide, in an automatic control system of the kind hereinabove generally described, means responsive to push button control for omitting any one or more of the exposures in the normal cycle of stop positions of the system.

A still further object of the invention is to provide means responsive automatically to push button control for cutting out all but one stop position from the normal cycle of operation of the system, so that the camera can be used for successive exposures at one lens stop position only, with the same time period for each exposure.

Another object is to provide means automatically responsive to an initial setting of the control system so as to automatically interrupt, temporarily, the complete normal cycle of the control system just before the flash exposure is made, in order to permit the manual insertion of a special lens stop in the camera, as is often required for the flash exposure beyond certain limits of reduction in size of the reproduction.

A further object is to provide a control system of the character hereinabove described which is readily capable of being applied as an attachment to half-tone cameras of conventional construction, so as to convert them from manual or "continuous exposure" control operation to automatic control under my improved system.

The invention may best be understood by reference to the accompanying drawings, in which.

Figure 1:
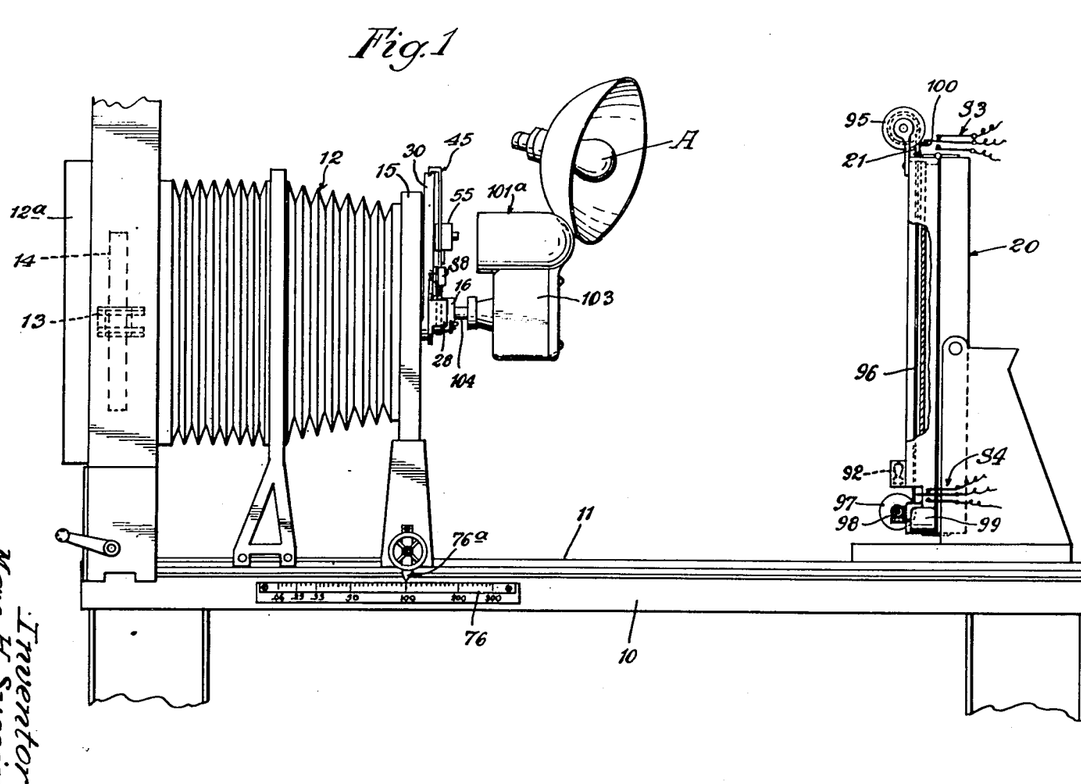
Figure 1 is a fragmentary side view of a photographic apparatus for half-tone work, and including a camera and a copy board, the copy board having a flash curtain thereon suitable for automatic operation in connection with my improved control system.

Referring now to details of the embodiment of my invention as specifically applied to a photographic apparatus designed for half-tone and similar work, Figure 1 shows a photographic apparatus, the essential elements of which are more or less conventional in design and arrangement for half-tone work, including an elongated base 10 having longitudinally extending side rails 11 on which is mounted for limited sliding adjustment a light chamber or camera 12, herein of the bellows type, having a focal plane frame 12a carrying, as usual, a ground glass or plate holder 13 with a half-tone screen 14 replaceably mounted within it. A lens frame 15 is slidably mounted on the rails 11 and by its adjustment along said rails perfects normal focus of an image projected by a lens 15a in a lens barrel 16 upon the focusing or sensitized surface in the focal frame 12a when no half-tone screen 14 intervenes. Since the general arrangement of the camera with its focal plane frame and half-tone screen is of conventional design and arrangement well known in the art, further details thereof need not be described herein.

The base 10 also has mounted for longitudinal sliding adjustment therealong a copy board 20 movable toward and away from the camera, as usual. Said copy board may, likewise, be of conventional form and arrangement, excepting that, in the present instance, it carries a flash curtain indicated generally at 21, arranged to be automatically drawn across the copy mounted on the face of the copy board for making a "flash" exposure, as will hereinafter more fully be described.

Figure 2:
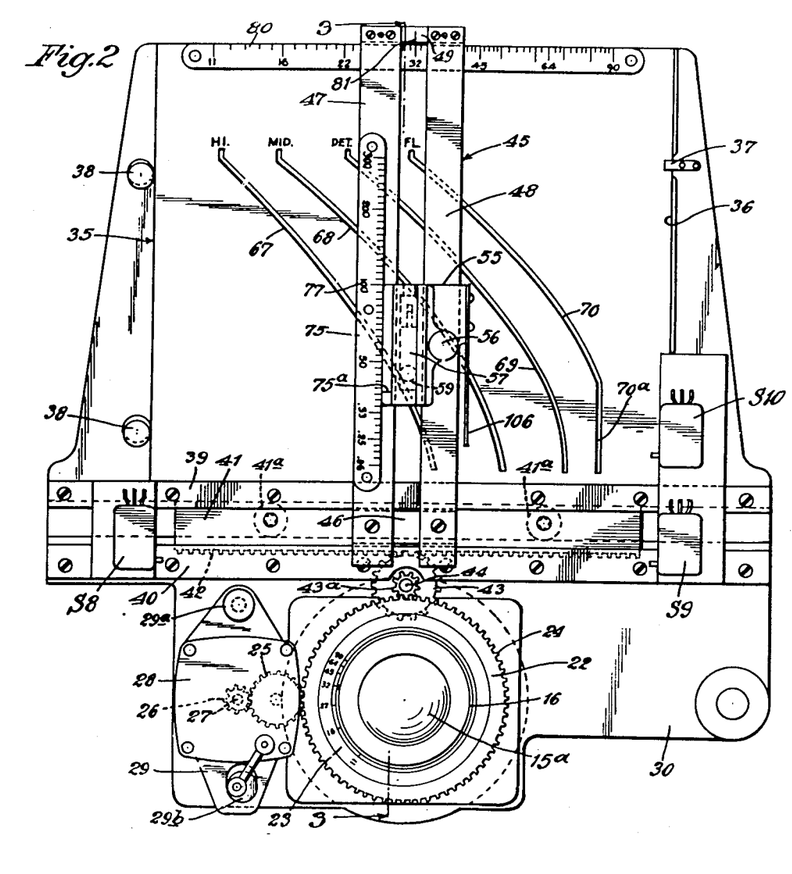
Figure 2 is an enlarged detailed face view of the lens at the front end of the camera shown in Figure 1, together with a master plate and associated mechanism for adjusting the size of the lens opening automatically in connection with other operating parts of my improved control system.

The lens barrel 16 is provided with a conventional expanding and contracting lens diaphragm operated, as usual, by rotating a control ring, herein indicated at 22, so as to adjust the size of the diaphragm opening to various "f" stops or sizes which may be indicated, also as usual, on the dial 23 as seen in Figure 2. In the specific form shown, the "f" stop calibrations range from f11 to f90, although of course it will be understood that the range of "f" stop adjustments can be increased or decreased as desired. Since the construction of the lens diaphragm or "f" stop adjustment means is quite old in the camera art, no further details thereof need be shown or described herein.

The "f" stop adjusting ring 22, as employed in connection with the present invention, is provided with a toothed periphery 24, which is adapted to mesh with an idler gear 25 connected to a drive pinion 26 on an armature shaft 27 of an electric diaphragm control motor 28 forming a part of my improved control system.

In the form shown herein, the motor 28, together with idler gear 25, is mounted on a swinging plate 29 pivotally supported at its upper end on a pivot pin 29a fixed to a base plate 20, and adjustable by an eccentric 29b, so as to move the idler gear 25 into and out of meshed relation with the "f" stop adjusting ring 22, when it is desired to connect or disconnect the motor 28 from operative engagement with said "f" stop ring.

The lens barrel 16 is suitably mounted on the base plate 20, which is mounted on the front face of the lens frame 15 of the camera, with the lens barrel in alignment with an aperture 31 formed in said plate, which communicates with the interior of the light chamber 12. A portion of the base plate 30 projects upwardly above the lens barrel and is also extended laterally to form a mounting for a generally rectangular master plate 35.

The master plate is detachably mounted on base plate 30 by means of an upright shoulder 36 along one edge with a retaining lug 37, beneath which one side edge of the master plate 35 engages and is held in position by a plurality of eccentric rotatable pins 38, 38 on the base plate, engageable with the opposite side edge of said master plate.

Two vertically spaced guide bars 39 and 40 are mounted along the base plate 30 below the master plate 35 with a rack bar 41 slidably mounted therebetween, with gear teeth 42 along the lower edge thereof between the lower guide bar 40 and the upper face of the base plate 30. The rack bar may also have anti-friction rollers 41a on its rear face, engaging in a slot 41b in the base plate 30.

The teeth 42 on the rack bar 41 are engaged with a geared pinion 43 on shaft 44, which has a smaller geared pinion 43a thereon meshed with the toothed periphery 24 of the stop adjusting dial 22.

Figure 3:
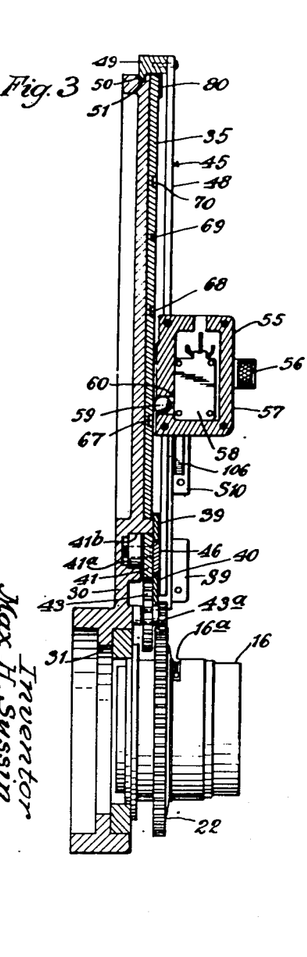
Figure 3 is a section taken on line 3—3 of Figure 2.

A replica scale arm, indicated generally at 45, is fixed at its lower end to a block 46 secured to the outer face of the rack bar 41 and projecting outwardly between the upper and lower guide bars 39 and 40. In the form shown herein, the replica scale arm 45 comprises two parallel laterally spaced bars 47 and 48 with their lower ends suitably secured to the block 46 on rack bar 41 and their upper ends connected by a cross bar 49 extending inwardly over the top edge of the master plate 35. The cross bar 49 has a guide flange 50 slidably engaged in a slot 51 formed along the upper edge of the base plate 30, as shown in Figure 3, to hold the scale arm 45 against the upper face of the master plate as it is moved across the latter.

An indicator 55 is slidably adjustable vertically between the bars 47 and 48 of the replica scale arm 45. In the form shown herein, said indicator has an adjusting knob 56 on the outer face of a hollow casing 57 enclosing a micro-switch 58 of conventional form. Said micro-switch is actuated through a spring-pressed ball 59 normally riding along the upper face of the master plate 35 and retained for limited movement in an aperture 60 formed in the under face of the casing 57, as shown in Figure 3. The micro-switch 58 is normally open excepting when the ball 59 drops into one of a series of arcuate grooves 67, 68, 69 and 70 formed in the outer face of the master plate 25. The nature and purpose of these grooves will presently be described.

A replica scale 75 is mounted on one of the upright bars 47 of scale arm 45 and carries calibrations thereon, in position to be read in connection with an index mark 75a on the indicator casing 57, as the indicator 55 is manually adjusted by vertical movement along the scale arm 45. The calibrations on the scale are marked to correspond substantially with a calibrated focusing scale 76 of the kind usually provided along one of the supporting rails 11 of the camera, to indicate the setting of the lens frame 15 of the camera at the proper focal length for the desired amount of expansion or reduction of the copy. As will be seen from Figure 2, the calibrated scale 75 has an index point 77 marked 100; from this index point, the scale is suitably calibrated upwardly for increase of reproduction, and downwardly for reduction of the reproduction. In the form shown herein, the scales 75 and 76 are calibrated in accordance with the percentage of increase or reduction of size of the reproduction.

A scale 80, calibrated in "f" stop sizes corresponding to the stop sizes of the lens 15a, is mounted along the upper edge of the master plate 35 in registering relation with an index mark 81 on the cross bar 49 at the upper end of calibrating scale arm 45. This index mark shows the size of the lens diaphragm as the calibrating scale arm 45 with a rack bar 41 is moved longitudinally to rotate the diaphragm adjusting ring 22 into its several permissible positions of "f" stop settings. In other words, the reading of index mark 81 on the scale 80 corresponds with the "f" stop reading on the circular scale 23 surrounding the lens as the scale arm 45 is moved by the diaphragm motor 28 in either direction along the master plate.

The arcuate grooves 67, 68, 69 and 70 are, in effect, graph-like representations of predetermined formulae, for the most effective "f" stop settings for hilite, middle-tone, detail and flash exposures used in half-tone work depending upon the relative size of the copy and the reproduction. These formulae are fairly consistent for most lenses, and are usually found on charts or tables which have heretofore been employed for manual manipulation and adjustment of half-tone cameras. Variations are sometimes met with in certain types of lenses, in which case the proper formulae can be ascertained by tests of the individual lenses, and reproduced in graph-like form by necessary variations in shape of the grooves 67, 68, 69 and 70. In general, however, the "f" stop size is largest for the greatest expansion of the copy and is reduced as the ratio between reproduction and copy is reduced. This general law of ratio is clearly indicated by observing the shape of the four grooves 67, 68, 69 and 70 on master plate 35. Thus, these grooves constitute, in effect, graphic reproductions, or are the practical equivalent, of an ordinary graph, which could be employed by the photographer in making his manual settings for successive exposures at hilite, middle-tone, detail and flash exposures. In the present embodiment, these curves are reproduced in the form of grooves offset from the surface of the master plate 35 so as to co-operate with and control the operation of the micro-switch 58 in any position of relative size of reproduction and copy to which the camera is initially adjusted. After such initial adjustment, the micro-switch 58 cooperates automatically with other parts of the control system to effect a complete series of successive exposures without any further attention from the operator, excepting under certain conditions, as will now be described by reference to Figure 4.

*Half-tone reproductions from a copy*

Figure 4:
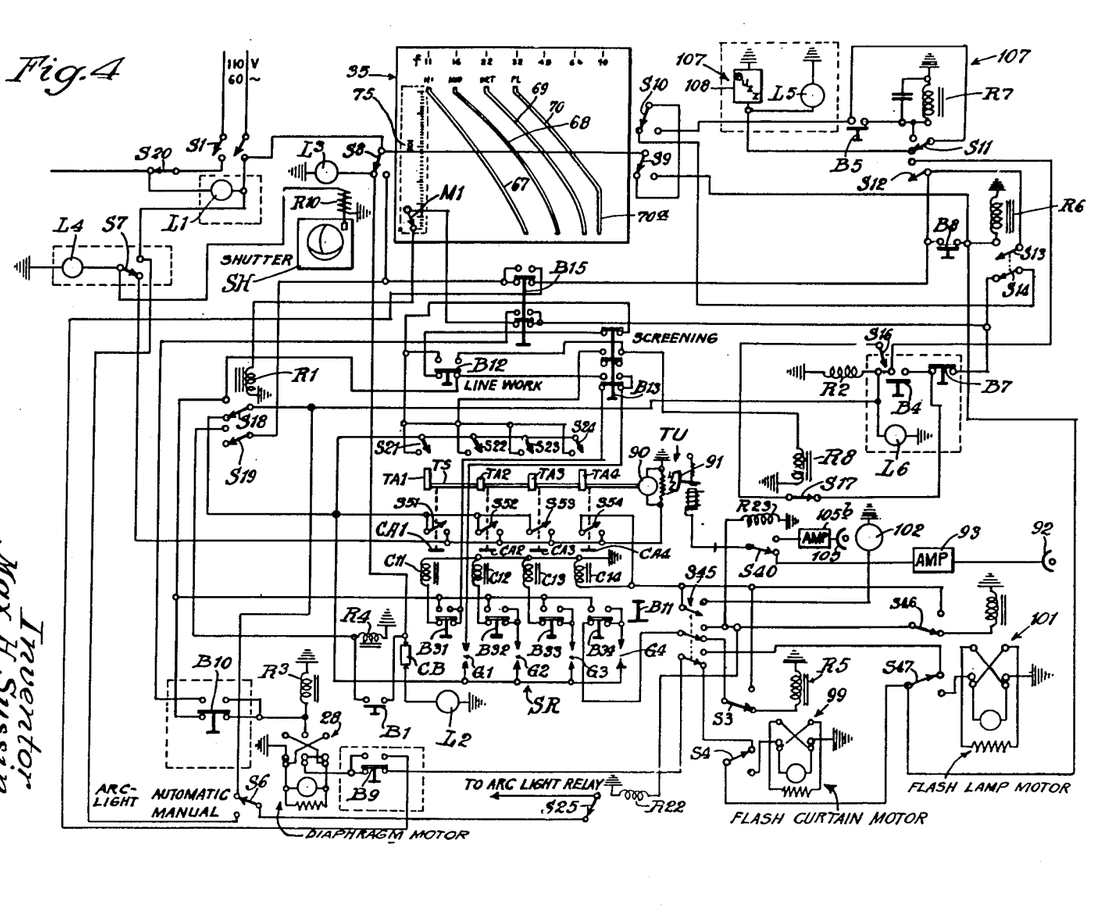
Figure 4 is a schematic electric wiring diagram of the control system for the apparatus shown in the preceding figures.

One of the most important uses to which my improved control system is adapted is for making a series of half-tone reproductions from a copy. The control system operates automatically for this purpose as follows:

Power is supplied to the system shown diagrammatically in Figure 4 through double pole switch S1, as from a 110-volt 60-cycle circuit. A pilot light L1 will light up when power is turned on. A shutter switch S7 is provided to permit operation of the shutter SH either manually or automatically. As shown in Figure 4, the shutter switch is in the "automatic" position. An arc light switch S6 if also provided for manual or automatic operation of the arc lights when the switch S6 is in either the manual or automatic position. For automatic half-tone operation, both switches S7 and S6 should be in "automatic" position.

Power from switch S1 is conducted to one side of switch S8 adjacent the master plate which is a limit switch normally open by contact with the arm 45 on the master plate, when said arm is moved to its initial or starting position. When the switch S8 is open, the pilot light L3 will be on and a circuit will also be completed through a bar CB of the stepping relay indicated generally at SR, and from thence through a pilot light L2 if the bar CB is in proper initial or starting position in said stepping relay.

The stepping relay SR is of a well-known construction in which the contactor bar CB is moved or rotated in a step-by-step progression to a succeeding station each time the solenoid R4 is energized. For convenience of diagrammatic illustration in Figure 4, the contactor bar CB is shown in progression in a linear path. Further details of said stepping relay need not be shown and described, excepting those parts diagrammatically indicated in Figure 4.

If pilot light L3 should fail to light, indicating that the arm 45 is not in its initial or starting position, the operator presses button B8 to close a circuit through the other branch of limit switch S8, normally closed button B15, and relay R6 which attracts switches S13, S14. Relay R6 serves to hold switch S13 closed. Power will then be supplied through switch S14 to the diaphragm motor 28 by way of switch S4 and button B9. The diaphragm motor will then be energized to return bar 45 with its main control switch M1 to the starting position at the extreme left side of the master plate until limit switch S8 is opened and pilot light L3 lights up. When limit switch S8 is opened, relay R6 is de-energized and switch S14 drops open, to shut off power to the diaphragm motor.

Should pilot light L2 fail to light, button B1 controlling stepping relay SR is depressed a proper number of times to energize the relay R4 to move the contact bar CB successively into its initial or starting position in the circuit between switch S8 and pilot light L2.

The system is ready to start automatic halftone work when pilot lights L1, L2 and L3 are on. The camera work may be set up on the copy board in the usual manner and the camera focused to give the desired expansion or reduction of the copy by adjusting the lens plate 15 along the rail 11. The operator then sets the sliding indicator 55 on the replica scale 75 on bar 45 to the same setting as indicated by the position of the pointer 76a relative to scale 76, which corresponds with the amount of expansion or reduction of the copy. It may be observed however that the operator may, in some instances, find it desirable to deviate somewhat one way or the other from setting his indicator 55 exactly the same as shown by the focusing pointer 76a, as for instance, where he may wish to emphasize or de-emphasize certain tone values in the reproduction.

Assuming that the sequence of exposures is to include all four stop positions, namely hilite, middle-tone, detail and flash, all four push buttons B31, B32, B33 and B34 will be in normal closed position, as shown in the diagram Figure 4. The operator depresses a spring-returned "starting" button B4 momentarily to start the exposure cycle. This closes a circuit from one side of switch S1 through switches S9, S10, S14 and stop button B7, normally closed manual button B15 and mirco-switch M1 through relay R1 to ground. Relay R1 attracts a double pole switch S16, S19. Momentary closing of starting button B4 also establishes a holding current through relay R2 to close switch S16 and supply power to switch S18 through normally closed switch S17 and switch S18, also causing pilot light L6 to light up. This completes a secondary circuit through switch S18 from starting button B4 to relay R3 so that the starting button B4 can be released. Relay R3 closes a circuit to the diaphragm motor 28 which starts to move the replica scale arm 45 with switch M1 toward the right along the master plate 35. Switch S18 simultaneously closes a line to one side of the push buttons B31, B32, B33 and B34 of the stepping relay SR.

Switch S19 is simultaneously actuated by relay R1 to close a circuit through relay R4 of the stepping relay SR which acts to shift the contact bar CB of the stepping relay from its initial starting position shown in the diagram Figure 4 into the second step or "hilite" position in the gap G1 between two opposed contacts of said stepping relay. A branch line from the line leading from the starting switch to switch S18 leads to switch S6. When the latter switch S6 is in "automatic" position, current will then be supplied through said switch S6 and a second switch S22, which is normally closed as shown in Figure 2, to a suitable relay (not shown) for lighting one or more arc lights A, set in position to illuminate the copy, as shown in Figure 1. The arc lights can also be illuminated directly from the main power switch by setting the switch S6 to its "manual" position.

The switch M1 on the replica scale arm 45 continues its transverse movement along the master plate 35 under power of the diaphragm motor 28 at the same level at which the indicator 55, carrying mirco-switch M1, has been initially adjusted, until the ball 59 of microswitch M1 engages in the first or "hilite" groove 67 on the master plate. As the ball drops into said hilite groove, current through the microswitch is broken to shut off the current supply to relay R1. Switches S18 and S19 then drop out and close a circuit through switch S18 to a group of switches S21, S22, S23 and S24, and a second group of switches S51, S52 and S53, both of which groups form part of a timing unit TU, as will presently be described. The circuit through switch S18 is closed to the lower contacts of the gaps G1, G2, G3 and G4 of stepping relay SR.

With the contact bar CB of the stepping relay now in the hilite position, current will pass through contact bar CB, button B13, the first or hilite button B31 and the first solenoid C11 associated with the timing unit TU. Energization of the solenoid C11 attracts an armature CA1 of a suitable clutch device, to connect the first timing arm TA1 mechanically with the timing shaft TS of the timing unit TU.

The timing unit TU of the form shown in Figure 4 is provided to limit the exposure period at each one of the four stop positions by selectively closing one of the limit switches S21, S22, S23 or S24 at the completion of the time period required for each successive exposure, through circuit connections that will hereinafter be more fully set forth. It will be understood that, if uniform light intensity of the arc lamps A used to illuminate the copy could be assured at all times, the switches S21, S22, S23 and S24 could be controlled by one or more suitable timing devices each set for the desired period of exposure at hilite, middle-tone, detail and flash positions. Since uniformity of light intensity on the copy is difficult to obtain in practice, however, I have shown in Figure 4 one form of timing unit including a light-integrating control circuit. The timing unit TU comprises an electric motor 80, driving the single timing shaft TS, with a series of timing cams or arms TA1, TA2, TA3 and TA4 mounted thereon, and each arranged to be operatively clutched to said shaft by suitable clutches actuated by armatures CA1, CA2, CA3 and CA4, respectively, energized by solenoids C11, C12, C13 and C14.

The last-named solenoids are energized successively during the operation of the stepping relay SR, as will hereinafter be more fully described.

In order to insure the proper amount of total light imposed upon the copy for each exposure period, the rotation of the timing shaft TS of the timing unit TU is preferably controlled by an escapement mechanism 91 actuated by a light integrating circuit, including one or more photoelectric cells 92 placed in suitable position along one edge of the copy board 20 so as to be responsive to the amount of light imposed on the copy. Such light integrating circuits are well known in the photographic art as disclosed, for instance, in U. S. Patent No. 2,408,576, so details thereof need not be further described herein, excepting to point out that, in the form shown herein, the photocell 92 is connected through its amplifying unit 93 to the escapement mechanism 91 through a two-way switch S40, which is normally closed to said amplifier 93 and photocell 92, as shown in Figure 4.

From the above description of the light integrating circuit and the escapement mechanism 91, which controls the speed of rotation of the timing shaft TS of timing unit TU, it will be understood that the terms, "exposure time," or "exposure period," used in the present description, include the amount of light as measured by the light integrator as a function of each such exposure time or exposure period.

Resuming now the description of the operation of the control system for the exposure at the first or hilite stop position: When the contact bar CB of the stepping relay SR has been moved by the first energization of relay R4 to the hilite position to close gap G1, current will pass through contact bar CB, push button B13, back to one side of the first or hilite button B31 and through the solenoid C11 to energize the first armature CA1. This engages the first clutch device for connecting the first timing arm TA1 to the timing shaft TS of the timing unit TU.

A circuit is also closed simultaneously with the actuation of the first clutch armature CA1 through switches S51, S18, S5 and S7 to a shutter-operating relay R10 which opens the shutter SH to begin the hilite exposure. The pilot light L4 is also parallel with the shutter relay R10 so that said pilot light will be lighted to indicate that the camera shutter is open.

The solenoid C11 in addition to attracting the clutch armature CA1, also closes the switch S51 to close the circuit to the timing unit motor 90. Timing unit motor 90 then tends to turn the timing shaft TS to advance the timing arm TA1 toward a limit switch S21. The speed of rotation of the timing shaft and timing arm are under control of the light integrator escapement 91, which in turn is responsive to the amount of light imposed upon the copy.

The angle through which the timing arm TA1 moves, before it engages the limit switch S21, depends upon the initial angular position of said timing arm with respect to the limit switch S21 when the timing shaft starts its rotation. Therefore, the timing arm TA1 is initially adjusted so that, whenever it is unclutched from the timing shaft, it will be returned, as by a return coil spring, to its initial starting position at a predetermined angular distance from its respective limit switch S21. Consequently, when the timing arm TA1 becomes clutched to the timing shaft, it will be moved by the latter for the proper predetermined period for completing the first exposure at the hilite stop position, under control of the escapement mechanism 91.

The timing arm TA1 continues movement toward its limit switch S21 until the completion of the exposure period for the hilite exposure. Switch S21 then closes a circuit to relay R3 through button B13, one side of button B12 and through button B10. Relay R3 closes the circuit to the diaphragm motor 28 to resume movement of the calibrating scale arm 45 toward the right side of the master plate 35. This moves the ball 59 of micro-switch M1 out of the hilite groove 67 to continue its movement horizontally toward the second or middle-tone groove 68 on the master plate.

As the ball 59 of micro-switch M1 is moved out of the hilite groove, the latter switch is closed to complete a circuit to relay R1, attracting switches S18 and S19. This shuts off the current to the shutter relay R10, causing the shutter SH to close. Current is also shut off to the clutch relay C11, releasing clutch armature CA1 and permitting the timing arm TA1 to be returned by its coil spring to its initial or rest position. The circuit is thus restored to its initial condition in which the micro-switch M1 began its movement from initial or starting position toward the first or hilite groove, excepting that now the contact bar CB of the stepping relay will be moved by a second energization of the relay R4 into the next or middle-tone gap position in said stepping relay, indicated at G2 in Figure 4.

When the switch M1 reaches the second or middle-tone groove, the control circuit is restored to its open shutter position, previously described, excepting that now the second clutch armature CA2 engages the timing arm TA2 with the timing shaft TS to give the proper length of exposure at the middle-tone stop position. Under ordinary circumstances, the middle-tone exposure is set for a considerably longer period than the first or hilite exposure so that the timing arm TA2 is initially set to move through a considerably greater arc than the timing arm TA1, before it engages its respective limit switch S24.

The same cycle is also repeated for the third or "detail" exposure as for the hilite and middle-tone exposures, with the exception, of course, that the length of time of the detail exposure depends upon the initial angular setting of the timing arm TA3 on timing shaft TS, with respect to the limit switch S23.

In the case of the fourth or "flash" exposure, it may be explained that two different methods for making such exposure have heretofore been commonly employed. There is no attempt in either method to reproduce the copy photographically, but instead the entire sensitized surface in the camera is exposed to uniform light which, when passed through a relatively small lens stop and then through the half-tone screen, imposes minute white dots on the solid black areas, so as to break up the solid black areas formed by previous exposures on the sensitized surface. This results in a more uniform effect in such black areas of the final half-tone reproduction. One of these methods consists in drawing a white curtain 21, called a "flash curtain," across the copy board to make the final "flash" exposure. The second method consists in moving a flood lamp into the field of the camera, close to the lens, so as to direct a uniform light from the flood lamp into the camera.

In the present embodiment of my invention, I have incorporated means whereby the operator may at his option employ either method of producing the flash exposure in the sequence of automatically controlled exposures.

Referring first to the means for employing a flash curtain for the flash exposure, the flash curtain 21, shown in Figure 1, consists of a flexible sheet of suitable light-reflecting material mounted on a roller 95 disposed along the upper edge of the copy board 20. The roller 95 may be of the usual spring-return type. Pull cords 96, 96 are trained along opposite sides of the copy board. The free ends of the pull cords 96, 96 are wound on a drum 97 which is connected through suitable gearing 98 to an electric motor 99, further identified as the "flash curtain motor" on the diagram Figure 4. The flash curtain 21 carries a stop 100 along its lower edge, adapted to engage upper and lower limit switches S3 and S4, respectively, mounted near the top and bottom of the copy board.

When the operator wishes to employ the flash curtain for the flash exposure, he initially sets a three-pole switch S45 in lowered position to connect the flash curtain motor in the system, as shown in the diagram Figure 4.

When the contact bar CB of the stepping relay SR reaches the flash position at gap G4, a circuit is completed from switch S18 through button B34, the center pole of switch S45 and relay R5 to energize the flash curtain motor 99 in a direction to draw the flash curtain down across the copy board automatically, until the stop 100 carried by the flash curtain opens the lower limit switch S4 to stop the flash curtain motor. Switch S3 is moved into position to close the contact through the fourth or last clutch relay C14 to engage the timing arm TA4 with the timing shaft TS and also to close the circuit to the shutter relay R10 through the switch S54, thus opening the shutter to start the flash exposure.

At the completion of the flash exposure, the switch S24 is contacted by the timing arm TA4 which, as before, completes a circuit to the diaphragm motor 28 to continue movement of the replica scale arm 45 with micro-switch M1 farther to the right; that is to say, beyond the "flash" groove 70 on the master plate 35. Simultaneously, as before, when the micro-switch M1 leaves said flash groove, the timing circuit is opened to cause the shutter to close, to stop operation of the timing unit TU, and permit the spring-actuated timing arm TA4 to return to its initial or rest position.

The diaphragm motor 28 continues to move the switch M1 with the replica scale arm 45 toward the right side of the master plate until the lower edge of the replica scale arm (see Figure 2) engages the normally closed limit switch S9 to open the latter, thereby interrupting the flow of current through S10, S14, B7, S17 and S16 to R2. S11 drops out, opening the circuit to the entire instrument, terminating the flash exposure, closing shutter SH. As S9 breaks current to R2, as mentioned in the above sentence, it establishes a closed circuit to R6, attracting S13 and S14. S13 provides holding current to R6 and closes circuit to flash curtain motor 99 through S4 returning flash curtain 21 to its storage position. S14 maintains the interruption to M1 preventing a recycling through R1.

When the flash curtain has been fully returned to storage position on roller 95, stop 100 will operate the limit switch S4 to open the circuit to the flash curtain motor, and close the circuit through switch S45 and button B9 to the diaphragm motor 28 to operate the latter in reverse direction. This latter motor returns the replica scale arm 45 and micro-switch M1 to their initial or starting positions at the extreme left side of the master plate. During this return movement of the replica scale arm, limit switch S9 resumes its normally closed position, but holding current to relay R6 is maintained through limit switch S8 and button B15.

When switch M1 reaches its initial position, an abutment on the bottom of replica scale arm (see Figure 2) actuates the limit switch S8 to open the circuit to relay R6 causing switches S13 and S14 to drop out, with a circuit closed to pilot light L3, to indicate the end of a half-tone exposure sequence, including the use of the flash curtain.

The alternative "flash lamp" method of making the flash exposure is put into effect by throwing the three-pole switch S45 to its upper position as seen in Figure 4. This cuts out the flash curtain motor 99 and substitutes the flash lamp motor 101 in the system, when the flash exposure is made in each sequence.

Figure 5:
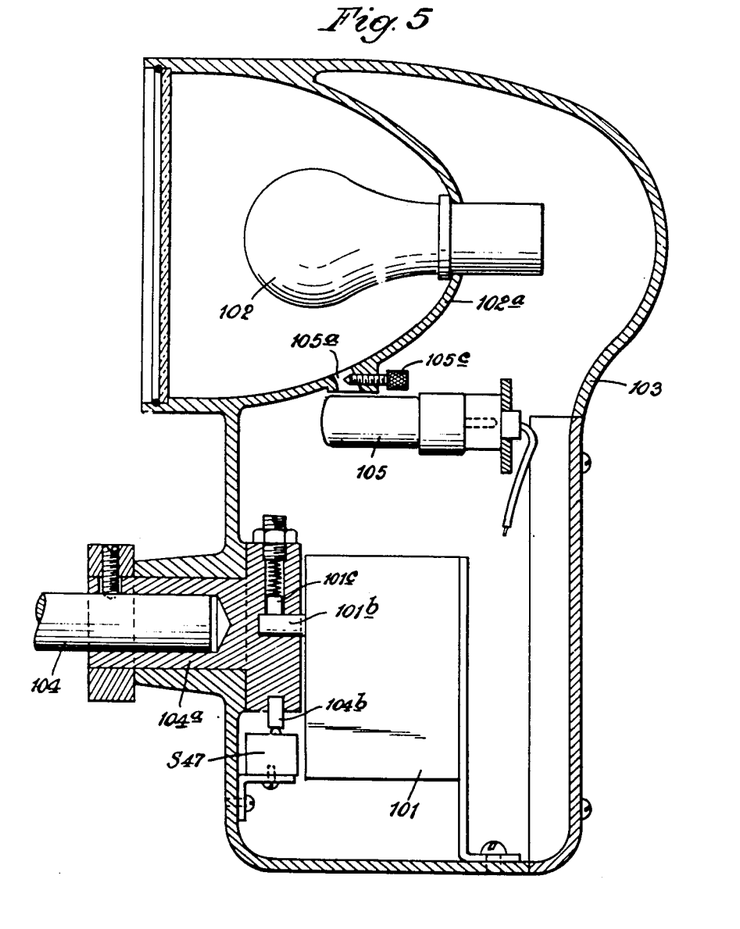
Figure 5 is an enlarged vertical section of the flash lamp employed under certain conditions with the control system.

The flash lamp, indicated generally at 101a in Figure 1, is shown in detail in Figure 5, and consists of a bulb 102 with a suitable reflector 102a mounted in a housing 103. Said housing is rotatably mounted on a shaft 104 having its inner end suitably supported on the front of the lens frame 15 so that the lamp and its reflector can be rotated into the field of the lens 15a, to project a flood of light directly upon the sensitized surface in the camera.

The housing 103 is normally disposed to one side of the lens barrel, and out of the field of lens 15a. When the sequence of exposures has progressed to the "flash" position, with the contact bar CB in the flash gap G4 of the stepping relay SR, a circuit is then established through button B34, the center pole of switch S45 and limit switch S46 of the flash lamp housing, to energize the flash lamp motor 101 in the direction to swing it into flood light position directly in front of the camera lens. The motor 101 is mounted in the housing 103, and is connected through a suitable gear reduction device (not shown) to a shaft 101b fixed as by a suitable yielding clutch device 101c to a bearing sleeve 104a, on the end of supporting shaft 104. The housing 103 is rotatably supported on the bearing sleeve 104a so that said housing will "walk around" the latter sleeve when the motor shaft 101b is rotated by power.

Limit switches S46 and S47, corresponding generally in function to the limit switches S3 and S4 of the flash curtain motor as previously described, are provided at suitable points within the housing 103 in position to be engaged by a stop 104b on sleeve 104a for effecting reversal of rotation of the flash lamp motor at opposite limits of rotation of said flash lamp housing.

As will be seen from the diagram Figure 4, the upper pole of switch S45 completes a circuit to flash lamp 102 through switch S7 during the flash exposure, and a circuit is also completed through a relay R22 to open switch S25 leading to the arc light relay during the flash exposure, since the arc light A is not needed when the flash lamp is in operation.

A phototube 105 is mounted adjacent the flash lamp and responsive to the light emitted therefrom. In the preferred form shown herein, said phototube is mounted on the interior of housing 103 and an aperture 105a is formed in the reflector 102a to permit the light from said lamp to strike the receiving surface of said phototube. The phototube is part of an auxiliary light integrating circuit including an amplifier 105b. The escapement mechanism 91 of the timing unit TU is connected by switch S40 to the photocell 92 at all times excepting when the flash lamp is in operation for a flash exposure. In the latter condition, a relay R23 is energized to shift switch S40 into position to connect phototube 105 to the escapement mechanism 91 of the timing unit.

Adjustment for the size of the aperture 105a may be provided as by a knurled screw 105c, the end of which projects into said aperture to vary the amount of light imposed upon the phototube 105, when desired.

In any event that the operator desires to eliminate an exposure at any one or more of the stops during a sequence of exposures, a corresponding locked-in button B31, B32, B33 or B34, as the case may be, is depressed at the beginning of the sequence. For instance, should the detail button B32 be depressed, current passing through the contact bar CB of the stepping relay, when in the detail gap position G2, will be shunted through button B10 to the diaphragm motor 28 so as to continue operation of the latter and carry the replica scale arm with the micro-switch M1 across the detail groove 69 on the master plate 35 without stopping, thus omitting any exposure in the detail stop position. Any one or more of the stops may be omitted in the sequence by depressing the proper button or buttons, as desired.

In cases where the reduction of the copy is relatively great, the diameter of opening of the lens diaphragm normally afforded by conventional diaphragm controls may not be small enough to provide the desired diaphragm ratio for the "flash" exposure. For instance, in the form shown in Figure 2, it will be observed from the shape of the "flash" groove 70 on the master plate 35, that said groove passes laterally beyond the smallest (f90) conventional position when the reduction is in excess of approximately 40 per cent, as indicated on the scale 77. Accordingly, I provide means for permitting the manual insertion of special "flash" stops or discs having still smaller diaphragm openings, in a slot 16a usually provided in the lens barrel 16 for that purpose. Since such insertion of a special flash stop must be done manually, the system is aranged to permit fully automatic operation of the camera for the first three exposures, namely hilite, middle-tone and detail stops, as before, but, whenever the micro-switch M1 is initially adjusted to any position where the use of a special manual flash stop is indicated, an auxiliary circuit is provided to discontinue the automatic operation of the camera temporarily, at the proper time, to permit the operator to insert such special stop manually, and then complete the sequence automatically.

For this purpose, a limit switch S10 is placed in position at the right side of master plate 35, in position to be opened by an abutment 106 carried on the indicator 55 on replica scale arm 45, whenever said indicator is set below the predetermined level where a manual stop is required. The arrangement is such that the ball 59 of the micro-switch M1 drops into the lower upright portion 70a of the flash groove when switch S10 is actuated, but before limit switch S9 is opened. This opens all the operating circuits in the system and closes an auxiliary "manual flash stop" circuit indicated generally at 107 in the diagram Figure 4. Actuation of the manual flash stop switch S10 in this manner closes a circuit through switches S9, S10, S11 to pilot light L5 to light up the latter and also, if desired, to sound a buzzer 108. The buzzer is desirable in case certain types of film are being used where dark room lights cannot be tolerated. Consequently, the operator, upon seeing the pilot light L5 light up or upon hearing the buzzer, will then insert the proper manual flash stop in the lens barrel, as selected from a chart. He then restarts the system to complete the flash exposure by pressing button B5. Pressing the latter button energizes relay R7 to attract switches S11 and S12. Switch S11 supplies holding current to relay R7, while switch S12 supplies operating current through relay R2 to close switch S16. When the latter switch is closed, the system is then restored to operating condition to complete the final flash exposure automatically, by energizing relay R5 through switch S18, gap G4, button B34, middle pole of switch S45 and switch S3. From this point on, the control system operates in the same manner as previously described for the completion of the flash exposure.

It will also be observed from reference to Figure 2 that, when the indicator 55 on the replica scale arm 45 is initially set for a reduction which does not exceed approximately 40 per cent of the original copy, the abutment 106 carried by the scale arm will not engage the limit switch S10 when the ball 59 of micro-switch M1 reaches the flash groove 70. Instead, the ball will fall into the curved upper portion of said flash groove as it reaches the latter so as to provide full automatic control for all flash exposures at any f stop position greater than the minimum diaphragm ratio permitted by the conventional diaphragm control of the camera.

It will now be understood from the above description that the hilite, middle-tone, detail and flash curves on the master plate serve to determine automatically the size of the lens opening during each exposure at the hilite, middletone, detail and flash stop positions but that, owing to the varying curvatures of these four grooves, the size of the lens diaphragm at each stop position will depend upon the initial setting of the indicator 55 at the beginning of each sequence of exposures. The curvatures of the several grooves are based primarily upon well-known formulae heretofore employed for halftone reproductions, and often set forth in charts for reference by the operator. These formulae are more or less standard for most lenses, yet exceptional cases are sometimes encountered where slight variations from standard formulae, calling for corresponding variations in the grooves on the master plate, may give improved results. Consequently, I prefer to provide the master plate 35 as a detachable unit, as shown herein, so it can be removed from the front of the camera frame and replaced by another master plate when occasion demands.

It will be understood that the principal operating control devices of the system, together with the principal operating pilot lights, may be located where they will be most convenient for the operator, as for instance at a centrally located station either within a "dark room area" at the rear end of the camera, or outside the dark room area for a more remote control of the system. It may also be desirable in some cases to provide duplicate sets of control devices and pilot lights in parallel with each other, both within and outside the dark room area, particularly in cases where so-called panchromatic film is to be used, which is responsive to light of any form emitted from a pilot light. Such an arrangement is illustrated, for instance, in Figure 4 where the pilot light L1 is shown in parallel with a pilot light L11, the first-named pilot light being intended for location within the dark room and the second pilot light outside the dark room. A switch S20 is provided in series with the pilot light L1 so that the latter light may function when the operator is within the dark room, excepting when panchromatic film is to be used, in which case the switch S20 can be opened to cut out the pilot light in the dark room.

*Line work*

My control system may also be employed for successive or repeated exposures at one lens stop position, at any desired exposure time, as employed for instance in making successive photographic reproductions of "line work," such as black-and-white drawings or other copy, where a direct photographic reproduction is desired without the half-tone screen.

By pressing button B12, the control system is set up for such repeated line exposures. Starting button B4 may then be pressed at any time after B12 has been depressed. The system then operates automatically to shift the connector bar CB of the stepping relay SR to its first or hilite position, where it will remain in hilite position to permit any number of successive exposures thereafter at the same diaphragm setting and for the same exposure time, the exposure time being automatically controlled by the timing unit TU and the light integrating circuit, including the photoelectric cell 92. For most line work, the diaphragm setting and time exposure for the hilite stop usually gives the best results.

Accordingly, to start line exposures, the starting button B4 is depressed to move switch S16 so as to initiate the movement of the stepping relay to the desired stop point. When the microswitch M1 reaches the groove on the master plate corresponding with the desired stop point, a circuit to relay R1 is opened and switches S18 and S19 drop out. Switch S18 then supplies current to the proper timer clutch C11, C12, C13 or C14, as the case may be, through the connector bar CB. At the same time, the corresponding switch S51, S52, S53 or S54, as the case may be, is closed to energize the shutter relay and open the shutter. This also operates to start the timing unit so as to begin one line exposure cycle. Up to this point, the operation of the circuit is substantially the same as previously described in half-tone work.

When each line exposure is completed, however, current is diverted from its regular course at button B12 and directed to relay R8 to operate switch S17 momentarily. This breaks the holding current being supplied from button B7 through switch S16 and completes the exposure. Switch S16 then drops out and all the operating circuits are broken. To start the next line exposure in the same position, the starting button B4 is again depressed. During the entire exposure above described, the arc light A will be lighted by operation of a relay circuit through switch S6 when the latter switch is in automatic position, in the same manner as previously described in half-tone work. The main difference in the operation between half-tone work and line work, therefore, is that the line button B12, when depressed, causes both the micro-switch M1 and the control bar CB of the stepping relay to remain in their same positions, respectively, for successive exposures, unless another selection is made.

*Positive "screening" operation*

The screening operation consists primarily in producing four different film reproductions from the same color copy, one for each of the three primary colors and the fourth for black, with suitable light filters interposed for producing the four film reproductions mentioned. The screen operation involves the making of the four reproductions on negatives, and rephotographing each of them with the light source shining from behind and through the negatives and also through a screen to break up the images into dots.

Although screening operations, like line work, usually involve the making of successive exposures at the same stop position and with the same exposure period yet in general longer exposure periods are necessary for screening exposures because of the limited amount of light that can pass through the film being reproduced. Consequently, for screening operations, the microswitch M1 and the connector bar CB are preferably used at their respective middle-tone positions, where a considerably longer exposure period is usually effected than in the hilite positions.

To avoid possible error, and to expedite the setting of the system for screening operations in the middle-tone position, a push button B13 is provided. When said "screening" button is depressed and the system is started, it skips over the hilite position and automatically moves the microswitch M1 and the connector bar CB of the stepping relay SR at their middle-tone positions. When the micro-switch M1 arrives at the hilite groove, said micro-switch opens the circuit to relay R1 so that switches S18 and S19 will drop out, as usual. Switch S18 then supplies current through connector bar CB, the first button B31 in the stepping relay, through the screening button B13 and button B12 and back to relay R3, which keeps the diaphragm motor 28 energized and in operation instead of stopping when the micro-switch M1 reaches the hilite groove. In this manner, micro-switch M1 and connector bar CB skip the hilite position and both move to the respective middle-tone positions, where they automatically stop for successive screening exposures, in the same manner previously described in connection with the successive line work exposures.

For manual control of the diaphragm motor 28, to move it in either direction for setting the diaphragm at any desired size, a button B15 is provided. By depressing the button B15 before using the buttons B9 and B10, the latter buttons can then be selectively depressed so as to cause the diaphragm motor to operate in either direction for adjusting the lens diaphragm to any desired size, as indicated on the scale 80 along the top of the master plate 35.

Auxiliary control devices

Among other auxiliary control devices which may be found useful under special conditions are the following:

For manually controlled non-automatic actuation of the diaphragm motor 28 in either direction, button B15 is depressed, after which buttons B9 or B10 may be used to rotate the diaphragm motor in one direction or the other, as long as one of the latter buttons is held in depressed position.

Button B7 is an emergency stop button which will shut off the main operating circuits whenever it is depressed.

Button B11 is provided for releasing any of the push buttons B31, B32, B33 or B34 of the stepping relay SR, which may have been previously depressed to skip one or more exposure stops. The construction and operation of such a release button is well known in the art so further details need not be set forth herein.

Figure 6:
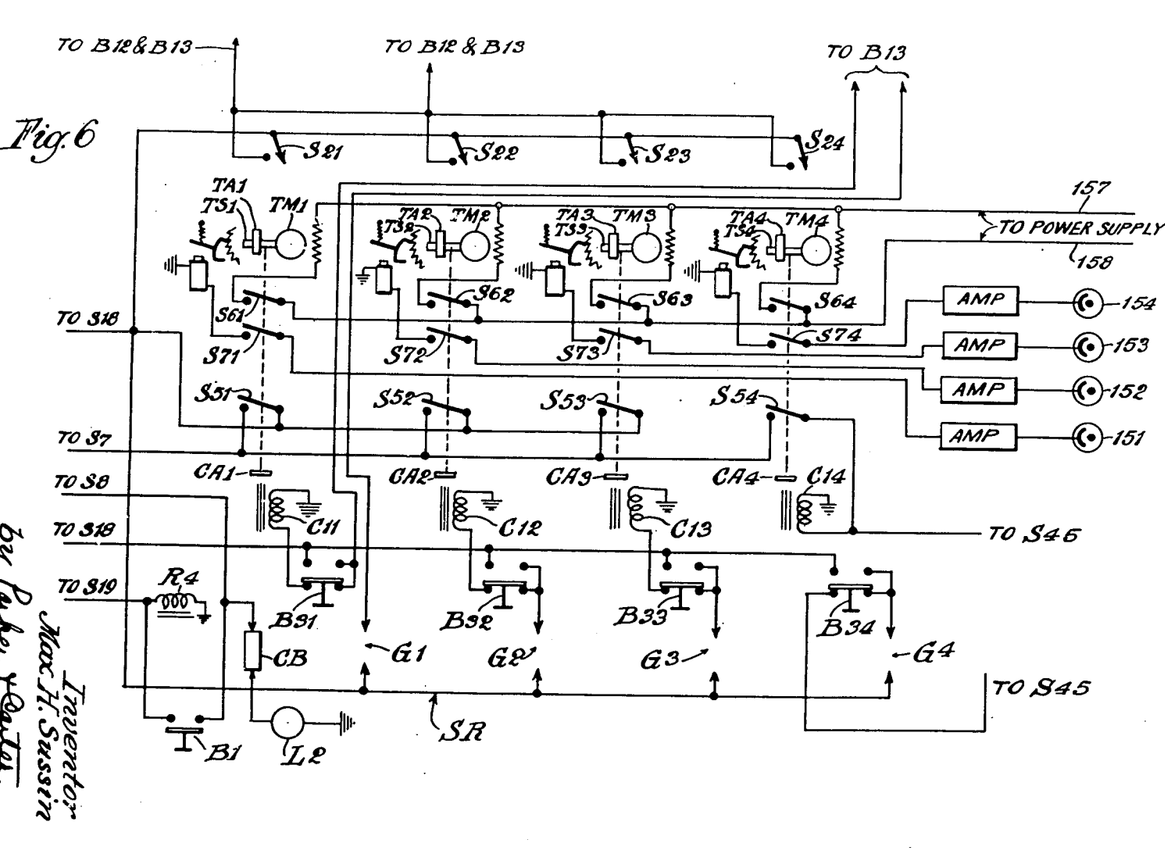
Figure 6 is a fragmentary schematic electric wiring diagram of a modified form of timing apparatus which can be used in place of the timing apparatus shown in Figure 4.

Modified form of timing mechanism—Figure 6

As an alternative arrangement for the timing unit TU in the schematic diagram of Figure 4 employing a single timing motor, shaft and light integrator escapement control, individual timing motors and light integrator circuits for each exposure stop may be employed, as shown in the fragmentary circuit diagram of Figure 6. In this latter diagram, the connections from the timing mechanism to the other portions of the circuit are the same as shown in the diagram of Figure 4. In the modified form of Figure 6, four similar timing motors are indicated at TM1, TM2, TM3 and TM4, each having individual escapement mechanisms controlled by separate light integrator circuits including phototubes 151, 152, 153 and 154, respectively.

Referring first to the timing motor TM1 serving the hilite stop exposure position, said timing motor may be operated from a suitable exterior source of power including lines 157 and 158 controlled by a switch S61. Said timing motor drives a shaft TS1 on which is mounted a timing arm TA1 adapted to actuate the limit switch S21.

When the stepping relay SR is actuated to move the contact CB across the hilite gap G1, solenoid C11 energizes the clutch armature CA1 in the same manner previously explained in connection with the circuit arrangement shown in the diagram Figure 4. Said clutch armature operates, as before, to clutch the timing arm TA1 to the shaft TS1 so as to start rotation of said timing arm toward the limit switch S21. The clutch armature CA1 also is mechanically connected to three switch arms S51, S61 and S71. The switch arm S51 has the same function as the switch arm S51 in the circuit of Figure 4. The switch arm S61 operates to close the circuit from current supply lines 157 and 158 to operate the motor TM1, and the switch arm S71 operates simultaneously to close the light integrator circuit between the phototube 151 and the escapement mechanism which controls the rotation of the timing shaft TS1.

The angle through which the timing arm TA1 moves before it engages the limit switch S21 depends upon the initial angular position of said timing arm with respect to said limit switch S21 when the timing shaft TS1 starts its rotation. The timing arm TA1 is provided, as before, with a return coil spring of conventional arrangement so that, when it is clutched to the shaft, it will be rotated until it engages the limit switch S21 to close the latter. Upon closing of the limit switch S21, a circuit is completed through buttons B12 and B13 to relay R3 (see Figure 4) which initiates a chain of operations of the circuit, as previously explained, so as to automatically shut off current to the clutch relay C11, releasing clutch armature CA1 and permitting the timing arm TA1 to be returned by its coil spring to its initial or rest position. Releasing of the clutch armature CA1 also shuts off the current to the motor TM1, disconnects the photocell 151 from the escapement mechanism controlling the rotation of shaft TS1, and restores switch S51 to open position.

The circuit connections to the remaining timing motors TM2, TM3 and TM4 are the same as those described in connection with the first timing motor TM1, excepting that said timing motors are individually controlled by operation of the clutch relays C12, C13 and C14, respectively.

Although I have shown and described certain embodiments of my invention, obviously other changes could be made by those skilled in the art to which the invention pertains so it will be understood that I do not wish to be limited to the exact construction shown and described, but that various changes and modifications may be made without departing from the spirit and scope of the invention as defined in the appended claims.

I claim:

1. In an automatic control system for effecting a series of successive mechanical operations, a master plate having a plurality of spaced graph-like lines offset thereon, the position of said lines being based upon a formula including two control factors which are mutually variable for each successive mechanical operation, control means for effecting said mechanical operations successively, including a scale arm movable transversely along said plate to various settings corresponding to one of said control factors, said scale arm having an electrical switch manually adjustable therealong to various settings corresponding with the second of said control factors, electrically operated drive means for varying the settings of said control means and simultaneously moving said scale arm to corresponding settings along said plate, said switch means being actuated by engagement with the offset lines on said plate at successive stations corresponding to the two control factors determined respectively by the initial setting of the switch on its scale arm and the transverse movement of said scale arm, means responsive to the actuation of the switch to discontinue temporarily the operation of said drive means at said successive stations, means also responsive to the actuation of said switch to effect a mechanical operation while said switch is halted at each such station, and means operative upon the completion of each such operation for resuming actuation of said electrically-operated drive means.

2. In an automatic control system for effecting a series of successive mechanical operations, a master plate having a plurality of spaced graph-like lines offset thereon, the position of said lines being based upon a formula including two control factors which are mutually variable for each successive mechanical operation, control means for effecting said mechanical operations successively, including a scale arm movable transversely along said plate to various settings corresponding to one of said control factors, said scale arm having an electrical switch manually adjustable therealong to various settings corresponding with the second of said control factors, reversible electrically operated drive means for varying the settings of said control means and simultaneously moving said scale arm to corresponding settings along said plate, said switch means being actuated by engagement with the offset lines on said plate at successive stations corresponding to the two control factors determined respectively by the initial setting of the switch on its scale arm and the transverse movement of said scale arm, means responsive to the actuation of the switch to discontinue temporarily the operation of said drive means at said successive stations, means also responsive to the actuation of said switch to effect a mechanical operation while said switch is halted at each such station, means operative upon the completion of each such operation for resuming actuation of said electrically-operated drive means to move said switch to a succeeding operating station, and limit switch means operable when said scale has traversed said plate in one direction to reverse the direction of movement of said electrically-operated drive means and return said scale and said control device to their initial positions in the opposite direction.

3. In an automatic control system for effecting a series of successive mechanical operations, a master plate having a plurality of spaced graph-like lines offset thereon, the position of said lines being based upon a formula including two control factors which are mutually variable for each successive mechanical operation, control means for effecting said mechanical operations successively, including a scale arm movable transversely along said plate to various settings corresponding to one of said control factors, said scale arm having an electrical switch manually adjustable therealong to various settings corresponding with the second of said control factors, reversible electrically operated drive means for varying the settings of said control means and simultaneously moving said scale arm to corresponding settings along said plate, said switch means being actuated by engagement with the offset lines on said plate at successive stations corresponding to the two control factors determined respectively by the initial setting of the switch on its scale arm and the transverse movement of said scale arm, means responsive to the actuation of the switch to discontinue temporarily the operation of said drive means at said successive stations, means also responsive to the actuation of said switch to effect a mechanical operation while said switch is halted at each such station, means operative upon the completion of each such operation for resuming actuation of said electrically-operated drive means to move said switch to a succeeding operating station, limit switch means operable when said scale has traversed said plate in one direction to reverse the direction of movement of said electrically-operated drive means and return said scale and said control device to their initial positions in the opposite direction, and other limit switch means actuated when said scale and said control device have been returned to their initial positions for discontinuing the actuation of said drive means in reverse direction.

4. In an automatic control system for effecting a series of successive mechanical operations, a master plate having a plurality of spaced graph-like lines offset thereon, the position of said lines being based upon a formula including two control factors which are mutually variable for each successive mechanical operation, control means for effecting said mechanical operations successively, including a scale arm movable transversely along said plate to various settings corresponding to one of said control factors, said scale arm having an electrical switch manually adjustable therealong to various settings corresponding with the second of said control factors, reversible electrically operated drive means for varying the settings of said control means and simultaneously moving said scale arm to corresponding settings along said plate, said switch means being actuated by engagement with the offset lines on said plate at successive stations corresponding to the two control factors determined respectively by the initial setting of the switch on its scale arm and the transverse movement of said scale arm, means responsive to the actuation of the switch to discontinue temporarily the operation of said drive means at said successive stations, means also responsive to the actuation of said switch to effect a mechanical operation while said switch is halted at each such station, means operative upon the completion of each such operation for resuming actuation of said electrically-operated drive means to move said switch to a succeeding operating station, limit switch means operable when said scale has traversed said plate in one direction to reverse the direction of movement of said electrically-operated drive means and return said scale and said control device to their initial positions in the opposite direction, other limit switch means actuated when said scale and said control device have been returned to their initial positions for discontinuing the actuation of said drive means in reverse direction, and means actuated by said last-named limit switch means for restoring said circuit to condition for effecting a subsequent series of mechanical operations.

5. An automatic control system in accordance with claim 1, wherein individual timing devices are provided for controlling each successive mechanical operation, and a stepping relay is actuated in step with the switch on said scale for operating said timing devices successively at their predetermined periods at each successive station.

6. In an automatic control system for effecting a series of successive mechanical operations, a master plate having a plurality of spaced graph-like lines offset thereon, the position of said lines being based upon a formula including two control factors which are mutually variable for each successive mechanical operation, control means for effecting said mechanical operations successively, including a scale arm movable transversely along said plate to various settings corresponding to one of said control factors, said scale arm having an electrical switch manually adjustable therealong to various settings corresponding with the second of said control factors, electrically-operated drive means for varying the settings of said control means and simultaneously moving said scale arm to corresponding settings along said plate, said switch means being actuated by engagement with the offset lines on said plate at successive stations corresponding to the two control factors determined respectively by the initial setting of the switch on its scale arm and the transverse movement of said scale arm, means responsive to the actuation of the switch to discontinue temporarily the operation of said drive means at said successive stations, means including a timing device also responsive to the actuation of said switch to effect a mechanical operation while said switch is halted at each such station for a predetermined time period, and means operative upon the completion of each such time period for resuming actuation of said electrically-operated drive means to move said switch to a succeeding operating station.

7. In a camera having a variable lens diaphragm, control means for effecting a series of exposures at different diaphragm settings, including a master plate having a plurality of spaced graph-like lines thereon based upon a formula including the size of copy and reproduction for each exposure, a scale movable across said master plate having calibrations thereon corresponding with the relative size of copy and reproduction, an indicator manually adjustable along said scale, means operatively connecting said movable scale with said diaphragm for opening or closing the latter whereby said indicator may be registered with one of said graph-like lines to set the diaphragm at the proper size for each exposure, depending upon the selected position of said indicator along said scale.

8. In a camera having a variable lens diaphragm and a shutter control means for effecting a series of successive exposures at different diaphragm settings including a master plate having a plurality of spaced graph-like lines offset thereon, the form of said lines being based upon a formula including the size of diaphragm opening and the relative size of copy and reproduction for each exposure, a scale transversely movable relative to said master plate having calibrations thereon corresponding with the relative size of copy and reproduction, an indicator manually adjustable along said scale, means operatively connecting said movable scale with said diaphragm for varying the size of the latter in response to successive settings of said scale along said master plate, electrically-actuated means for opening and closing said shutter, and an electric control circuit including a switch carried with said indicator on said scale, arranged to open the shutter for an exposure when said switch is actuated by engagement with said offset lines on the master plate, and close the shutter when said switch is not in actuating engagement with said offset lines.

9. In a camera having a variable lens diaphragm and a shutter control means for effecting a series of successive exposures at different diaphragm settings including a master plate having a plurality of spaced graph-like lines offset thereon, the form of said lines being based upon predetermined formula including the size of diaphragm opening and the relative size of copy and reproduction for each exposure, a scale transversely movable relative to said master plate having calibrations thereon corresponding with the relative size of copy and reproduction, an indicator manually adjustable along said scale, means operatively connecting said movable scale with said diaphragm for varying the size of the latter in response to successive settings of said scale along said master plate, electrically-actuated means for opening and closing said shutter, an electric control circuit, including a switch carried with said indicator on said scale, arranged to open the shutter for an exposure when said switch is in actuating engagement with one of said offset lines on the master plate, and close the shutter in other positions of said switch, and automatic timing means associated with said electric control circuit for limiting the time period of each such exposure.

10. In a camera having a variable lens diaphragm and a shutter control means, an automatic control system for effecting a series of successive exposures at different diaphragm settings including a master plate having a plurality of spaced graph-like lines offset thereon, the form of said lines being based upon a formula including the size of diaphragm opening and the relative size of copy and reproduction for each exposure, a scale transversely movable relative to said master plate having calibrations thereon corresponding with the relative size of copy and reproduction, an indicator manually adjustable along said scale, means operatively connecting said moveable scale with said diaphragm for varying the size of the latter in response to successive settings of said scale along said master plate, electrically-actuated means for opening and closing said shutter, an electric control circuit including a switch carried with said indicator on said scale, arranged to open the shutter for an exposure when said switch is in actuating engagement with said offset lines on the master plate, and to close the shutter when said switch is not in registration with said lines, automatic timing means associated with said electric control circuit for limiting the time period of each such exposure, a motor for simultaneously moving said scale across said master plate and for varying the size of said lens diaphragm opening, and means associated with said electric control circuit effective upon completion of one such exposure time period for energizing said motor to move said scale to register the switch on said indicator with a succeeding offset line to effect a succeeding exposure with a different size of lens diaphragm opening.

11. In a camera having a variable lens diaphragm and a shutter, an automatic control system for effecting a series of successive exposures at different diaphragm settings, including a master plate having a plurality of spaced graph-like lines offset thereon, the position of said lines being in accordance with a formula including the size of diaphragm opening and the relative size of copy and reproduction for each exposure, a scale having an electrical switch initially adjustable therealong to various settings corresponding to the relative size of copy and reproduction, a motor operatively connected with said diaphragm for varying the opening thereof, said motor also being connected to move said scale transversely across the surface of said master plate, electrically-actuated means for opening and closing said shutter, electric control circuit means responsive to the actuation of the switch on said scale when in engagement with the offset lines in said master plate to discontinue temporarily the actuation of said motor at successive exposure stations, means also responsive to the actuation of said switch to open said shutter for effecting an exposure while said switch is halted at each such exposure station, and means operative upon the completion of a predetermined exposure period for closing the shutter and for resuming the operation of said motor to move said switch to a succeeding exposure station.

12. A control system in accordance with claim 11, wherein the means operative upon the completion of a predetermined exposure period includes light integrating means responsive to the amount of light to which the sensitized surface of the camera is exposed during each exposure.

13. A control system in accordance with claim 11, wherein individual timing devices are provided for controlling each exposure period, and a stepping relay is actuated in step with said switch for effecting operation of said timing devices successively at their respective predetermined exposure period at each successive exposure station.

14. A control system in accordance with claim 13, wherein each timing device includes light integrating means responsive to the amount of light to which the sensitized surface of the camera is exposed during each exposure.

15. An automatic control system for a halftone camera in accordance with claim 11, wherein said control system includes flash lighting means for effecting a flash exposure at the end of each sequence of exposures, a reversible flash motor for said flash lighting means, and reversible switch means for automatically actuating said flash motor to move said flash lighting means into operative position relative to the sensitized surface of the camera during the flash exposure, and restore said flash lighting means to inoperative position after the completion of such flash exposure.

16. An automatic control system for a halftone camera in accordance with claim 15, wherein the flash lighting means comprises a flash curtain.

17. An automatic control system for a halftone camera in accordance with claim 15, wherein the flash lighting means comprises a flash lamp, and means are provided for illuminating said lamp automatically during the flash exposure.

18. An automatic control system for a halftone camera in accordance with claim 11, wherein an auxiliary control circuit is interconnected therewith, including a switch automatically actuated by engagement with a part carried with the switch on said traversing scale when said last-named switch is adjusted to a position on said scale where the optimum ratio of diaphragm opening and copy reduction for the flash exposure requires a smaller diaphragm opening than is afforded by the variable diaphragm mechanism of the camera, said auxiliary control circuit having means for automatically discontinuing the automatic operation of said system to permit the manual application of a smaller lens stop to the camera lens, and also having manually controlled switch means for resuming the automatic operation of said system.

19. An automatic control system for a halftone camera in accordance with claim 18, wherein the auxiliary control circuit includes a signal for indicating when automatic operation of the system has been discontinued.

20. An automatic control system for a halftone camera in accordance with claim 11, wherein a stepping relay is provided with successively closing switch means automatically actuated in step with the switch on said traversing scale at each exposure station, each of said successively closing switch means having circuit connections with timing means for limiting the exposure period at each successive exposure station.

21. An automatic control system for a halftone camera in accordance with claim 20, wherein each of the successively closing switch means of said stepping relay also have circuit connections controlled by individual switch means adapted to be preset for rendering its respective timing means ineffective and for continuing the operation of the diaphragm control motor for selectively skipping an exposure at any station when its respective individual switch means is closed.

MAX H. SUSSIN.

REFERENCES CITED

The following references are of record in the file of this patent:

UNITED STATES PATENTS

| Number | Name | Date |
| --- | --- | --- |
| 999,115 | Le Beau | July 25, 1911 |
| 2,149,250 | Bing | Mar. 7, 1939 |
| 2,253,055 | Tuttle | Aug. 19, 1941 |
| 2,261,205 | Annick | Nov. 4, 1941 |
| 2,461,403 | Wilcox | Feb. 8, 1949 |